United States Patent [19]

DeJager et al.

[11] Patent Number: 5,002,365
[45] Date of Patent: Mar. 26, 1991

[54] BEAM SPLITTER FOR COLOR IMAGING APPARATUS

[75] Inventors: Donald DeJager; Anna L. Hrycin; Andrew F. Kurtz; David Kessler, all of Rochester, N.Y.

[73] Assignee: Eastman Kodak Company, Rochester, N.Y.

[21] Appl. No.: 421,893

[22] Filed: Oct. 16, 1989

[51] Int. Cl.⁵ .......................... G02B 27/14; G02B 5/28
[52] U.S. Cl. ..................................... 350/166; 350/172; 350/173; 358/50; 358/55
[58] Field of Search ............... 350/166, 172, 173, 174, 350/286; 358/51, 54, 55

[56] References Cited

U.S. PATENT DOCUMENTS

| | | | |
|---|---|---|---|
| 4,072,405 | 2/1978 | Ozeki | 350/173 |
| 4,205,337 | 5/1980 | Millward | 358/54 |
| 4,310,847 | 1/1982 | Frohbach et al. | 358/54 |
| 4,384,769 | 5/1983 | Brei et al. | 350/174 |
| 4,472,735 | 9/1984 | Shinozaki et al. | 350/167 |
| 4,555,163 | 11/1985 | Wagner | 350/173 |
| 4,641,920 | 2/1987 | Matsuoka et al. | 350/173 |
| 4,784,469 | 11/1988 | Tsukada et al. | 350/287 |
| 4,823,187 | 4/1989 | Toyama et al. | 358/51 |
| 4,873,569 | 10/1989 | Hirosawa | 350/173 |

Primary Examiner—Bruce Y. Arnold
Assistant Examiner—Martin Lerner
Attorney, Agent, or Firm—Donald D. Schaper

[57] ABSTRACT

A beam splitter for color imaging apparatus is disclosed. The beam splitter comprises two prism elements which are joined together with a dichroic interference filter interposed between the two elements. An input beam to the beam splitter is divided into a first output beam which is reflected from the filter and a second output beam which is transmitted through the filter. In order to provide a beam splitter of a generally triangular cross section in which one of the output beams has the desired spectral content for a luminance channel in the imaging apparatus and the other output beam has the desired spectral content for a chrominance channel, the interference filter is formed of alternate layers of $SiO_2$ and $TiO_2$ and is disposed such that an input light beam to the beam splitter has a relatively small angle of incidence on the filter.

13 Claims, 1 Drawing Sheet

BEAM SPLITTER FOR COLOR IMAGING APPARATUS

BACKGROUND OF THE INVENTION

Field of the Invention

This invention relates to a beam splitter for color imaging apparatus, and more particularly, to a beam splitter which is particularly suitable for use in a linear array film scanner.

2. Description of the Prior Art

A linear array film scanner for use in television applications typically includes a light-sensitive linear charge coupled device (CCD) which provides a serial output representing a line of a television raster. For color television, the film scanner can include an assembly of three separate CCD arrays, one for each of the primary colors. The film is driven at a uniform rate past a light source, and a lens and beam splitter image an illuminated section of the film onto each CCD array. The film motion provides the vertical (frame) scan, and the linear cycling of the CCD arrays provides the horizontal (line) scan. Such a scanner is described in U.S. Pat. No. 4,205,337.

It is also known in film scanning systems to use a beam splitter to divide light from an illuminated line of film into two images, a luminance image and a chrominance image. A system of this type is shown, for example, in U.S. Pat. No. 4,310,847. One of the problems in a two-channel system is in achieving the proper color balance in each of the detection channels. In order to achieve the desired weighting of the primary colors in the luminance channel of the patented device, a color filter is placed in the channel to enhance or suppress portions of the visible spectrum. A repetitive array of color filters are also placed in the path of the chrominance image. The use of the separate balancing obtain in the system to obtain the desired color balance, however, makes the system considerably more complex. A further drawback is that the various filters tend to change in effectiveness over time, and thus, it is difficult to maintain the system in calibration.

SUMMARY OF THE INVENTION

It is an object of the present invention to overcome the problems in the prior art discussed above and to provide an improved beam splitter for color imaging apparatus.

In accordance with one aspect of the present invention, there is provided a beam splitter for use with color imaging apparatus which includes a luminance channel and a chrominance channel, the beam splitter comprising prism means for receiving an input light beam to the beam splitter, the prism means including two prism elements which are joined together to form a generally triangular body in cross section, one of the elements having an input face for receiving the input light beam thereon and a first output face and the other of the elements having a second output face; and a dichroic interference filter disposed between the elements for separating the input light beam into a first light beam which exits through the first output face and has a desired spectral content for the luminance channel and into a second light beam which exits through the second output face and has a desired spectral content for the chrominance channel, the first light beam having a lesser amount of blue light than the second light beam and a greater amount of red and green light than the second light beam.

In one embodiment of the present invention, the beam splitter is in the shape, in cross section, of a right angle triangle. The beam splitter comprises a first glass prism element which is joined to a second prism element. A dichroic interference filter is interposed between the two prism elements and is disposed at an angle of $22\frac{1}{2}°$ to an input face on the first glass prism element. The interference filter is formed by depositing alternate layers of $SiO_2$ band $TiO_2$ on one face of the second prism element before the two prism elements are joined together.

In the use of the beam splitter, an input beam of light enters the input face of the first prism element and impinges on the dichroic interference filter. A first output beam is reflected back to the input face which directs the beam out of the beam splitter. A second output beam is formed by light from the input beam which is transmitted through the interference filter, and this second output beam is internally reflected in the second prism element and directed out of the beam splitter. The angle of incidence of the input beam on the interference filter and the composition of the filter have been selected to produce first and second output beams having the desired spectral content for luminance and chrominance channels, respectively, of a linear film scanner. The first and second output beams form an angle of 135° with each other.

An advantage of the present invention is that the elements of the beam splitter cooperate to provide the proper color balance for a film scanner having two detection channels, a luminance channel and a chrominance channel. As a result, the use of separate color balance filters in the detection channels is not necessary. The shape of the beam splitter is an advantage in the handling and mounting of the device. A further advantage is that there is a wide angular separation between the two output beams; this facilitates arrangement of the components in the scanner and the mounting of the photosensitive arrays.

Other features and advantages will become apparent upon reference to the following description of the preferred embodiment when read in light of the attached drawings.

DESCRIPTION OF THE PREFERRED EMBODIMENT

The beam splitter of the present invention can be used in many applications in the electronic imaging art. However, it is particularly suitable for use in a linear array film scanner which has two detection channels, a luminance channel and a chrominance channel, and is used to produce a television signal from motion picture film. Such apparatus is disclosed in U.S. Patent Application Ser. No. 373,309, entitled "Method and Apparatus For Generating A High Definition Electronic Signal From a Line Scan of a Color Original," filed on June 29, 1989; this application is assigned to the assignee of the present invention and is expressly incorporated herein by reference.

Figure 1:
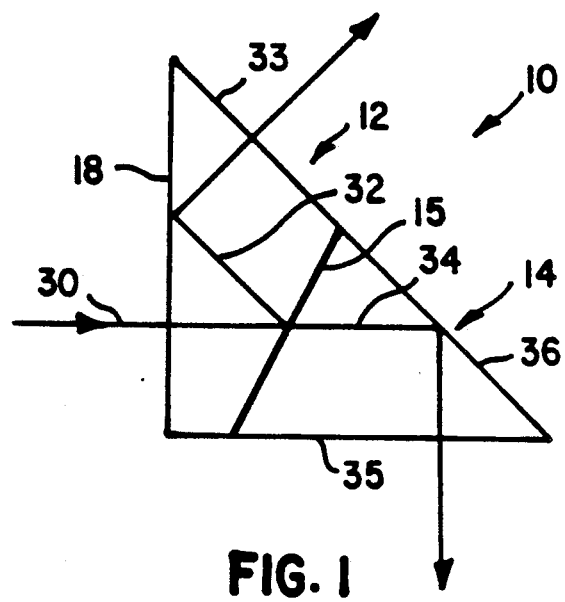
FIG. 1 is an elevational view of the beam splitter of the present invention.
Figure 2:
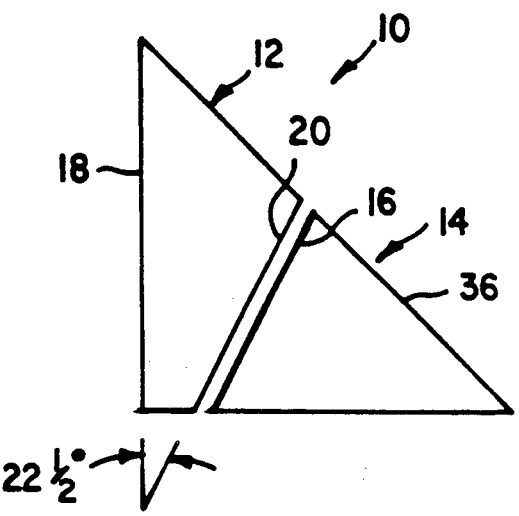
FIG. 2 is an elevational view showing the two prism elements of the beam splitter before they are joined together.

With reference to FIG. 1, there is shown a beam splitter 10 constructed in accordance with the present invention. Beam splitter 10 has a triangular body, in cross section and as viewed in FIG. 1, which is formed by a first prism element 12 joined to a second prism element 14. Elements 12 and 14 are shown in FIG. 2 as they appear prior to being joined together. As viewed in FIG. 2, prism element 14 is triangular in shape, and a dichroic interference filter 15, shown in FIG. 1, is formed on a face 16 thereof. Prism element 12 has a quadrilateral shape, in cross section and as viewed in FIG. 2, and element 12 includes an input face 18 and a face 20 opposite the input face 18 which is disposed at an angle thereto of $22\frac{1}{2}°$. Each of the prism elements can be formed of glass, for example, a BK7 glass. As will discussed in more detail hereinafter, an input light beam 30 enters the beam splitter 10 at input face 18, is separated by dichroic interference filter 15 into a first output light beam 32 which exits the beam splitter 10 through an output face 33 on prism element 12 and into a second output light beam 34 which exits through an output face 35 on prism element 14.

The dichroic interference filter 15 is formed on face 16 of prism element 14 and includes alternate layers of $SiO_2$ and $TiO_2$, that is a first layer of $TiO_2$ followed by a layer of $SiO_2$ followed by a layer of $TiO_2$, etc. Other refractory oxides could be used, for example, $Ta_2O_5$ and $HFO_2$.

In one exemplary filter 15 which includes 13 layers, alternate layers of $SiO_2$ and $TiO_2$ were applied by electron beam vacuum deposition to face 16 of prism element 14. After the interference filter 15 has been formed on face 16 of prism element 14, the face 20 of prism element 12 is joined to face 16 of the prism element 14. Elements 12 and 14 are joined by means of a UV curable adhesive, for example a Norland 61 adhesive, obtainable from the Norland Company. It has been found desirable to heat prism 4, with the filter 15 formed thereon, in an oven at 50° C. for approximately one hour before cementing elements 12 and 14 together.

In the use of beam splitter 10, input light beam 30 is directed toward the beam splitter 10, as shown in FIG. 1. Beam 30 is represented in the figure by a single ray, but it actually would consist of a multitude of rays forming a convergent or divergent cone of rays. The ray that is shown in the figure would thus represent the central ray or axis of the cone. Beam 30 can be, for example, a light beam that is modulated by the image in a film (not shown) and transmitted to the beam splitter 10 through an objective lens (not shown). Beam 30 is shown as entering the input face 18 at an angle of incidence of zero degrees and advances to the dichroic filter 15. The angle of incidence of beam 30 on filter 15 is determined by the angle which filter 15 makes with the input face 18, and this angle is 22.5 degrees. Other rays within the cone of rays represented by beam 30 would be incident on the dichroic filter 15 at angles somewhat smaller and also somewhat greater than 22.5 degrees.

This variation in the angle of incidence for different rays within the cone angle of the beam 30 is the cause of a small variation in the spectral transmittance of the dichroic filter, for these different rays. If the angle of incidence had been, for example, 45 degrees instead of 22.5 degrees, the variation of the spectral transmittance for these other ray s would have been considerably larger. This, then, is one advantage of using the relatively small angle of incidence of 22.5 degrees rather than, for example, 45 degrees.

The output light beam 32 is reflected at the filter 15 and returns to the input face 18 at an angle of incidence of 45 degrees. Again, the actual angles of incidence for the several rays in the beam will vary somewhat from 45 degrees, some at a smaller angle, others at a larger angle. For the beam splitter to work efficiently, these various angles of incidence should all be greater than the so called critical angle for total internal reflection. For example, assuming red light and BK7 glass, the critical angle is about 41.5 degrees. Rays internally incident upon the surface at an angle less than the critical angle are split into two rays, a refracted ray and a reflected ray. The refracted ray would represent lost energy, thereby decreasing the intensity of the reflected ray, and reducing the efficiency of the beam splitter. Thus, fOr most efficient operation, the semiangle of the cone of rays, within the glass, should be limited, in this case, to less than 3.5 degrees (45–41.5). For beams which have a larger semiangle of the cone of rays, within the glass, it would be highly advisable to use a type of glass which has a higher index of refraction.

After total internal reflection at face 18, the beam 32 leaves the beam splitter 10 through output face 33. The output light beam 34 is formed from the light transmitted through the dichroic filter 15. Light beam 34 is totally internally reflected at face 36 of prism element 14, and leaves the beam splitter through the output face 35.

It should be noted that the path length of output beam 32 through beam splitter 10 is the same as the path length of output beam 34 through the beam splitter. Another property of beam splitter 10 is that output beam 32 is reflected twice in the beam splitter whereas output beam 34 is reflected only once. Thus, if images are carried by the beams 32 and 34, the images will be reversed with respect t o each other, i.e., they will be mirror images of each other.

Beams 32 and 34, after emerging from beam splitter 10, form an angle of 135° with each other. This wide separation of the two output light beams 32 and 34 is particularly advantageous in certain scanner apparatus in that it facilitates the arrangement of &he scanner components and the mounting of the linear CCD arrays (not shown).

The 22.5 degree angle of the dichroic beam splitter, with respect to input face 18, is determined by both the requirement for total internal reflection of the beam 32 at face 18, and by the intrinsic geometry of the beam splitter. If the angle were smaller, the entire cone of rays of the beam 32 might not be totally internally reflected at face 18. And if the angle were larger than 22.5 degrees, the prism element 12 must be made larger and the beam splitter would no longer have a triangular shape in cross section. Also, if the angle were made larger, there would be a greater variation in the spectral transmittance of the dichroic beam splitter, for the various rays that constitute the beams. Thus, 22.5 degrees is an optimum value for the angle of the beam splitter.

An important feature of the beam splitter of the present invention is that it produces output beams having the proper color balance for the luminance and chrominance channels of a linear scanner as disclosed, for example, in the aforesaid U.S. patent application. The desired color balance is achieved through the use of an interference filter of the type disclosed herein. The filter is disposed within the beam splitter so that the input light beam impinges on the filter at an angle of about 22.5 degrees, rather than at a larger angle of about 45 degrees, as is more common for beam splitter prisms. The smaller angle of incidence made it possible to obtain t he desired type of color balance between the two output beams; this goal would have been far more difficult to achieve, had the angle of incidence been 45 degrees rather than 22.5 degrees.

Figure 3:
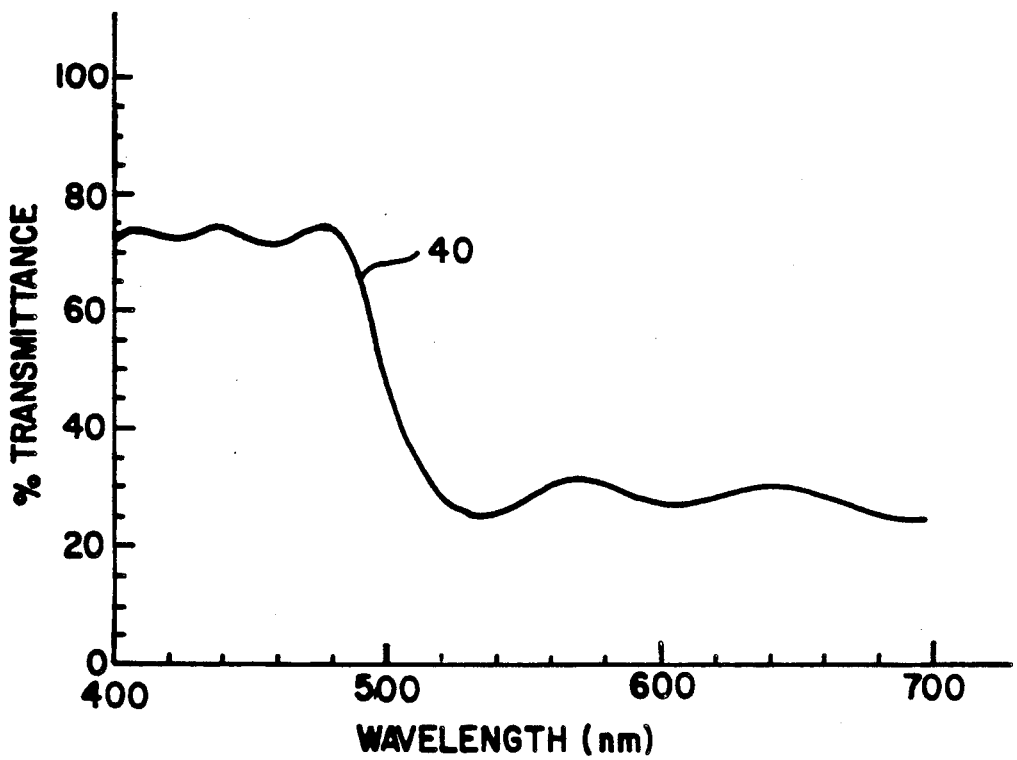
FIG. 3 is graph showing the percent transmittance versus wavelength of a beam for use in the chrominance channel of a film scanner.

It has been determined that optimum results can be obtained in a two channel scanner by providing less of the blue light to the luminance channel than to the chrominance channel. Consequently, the layers in filter 15 have been selected to produce more blue light in the chrominance channel than in the luminance channel. The percent transmittance versus wavelength of output light beam 34 for a chrominance channel is shown by a curve 40 in FIG. 3. Important aspects of the invention shown by the curve 40 are the sharp transition at about 500nm, from blue to green, and the relatively constant transmission in both the blue region of the spectrum and the red and green regions. Such a distribution in the spectral content of the beam makes it much easier to obtain the desired color balance in the two detections channels. The reflectance from filter 15 for a luminance channel, output light beam 32, is equal to one minus the transmittance shown in the curve 40. Thus, for example, the blue light in output light beam 32 would only be about 25% as compared with the approximately 75% shown in FIG. 3 for beam 34.

The invention has been described in detail with particular reference to the preferred embodiment thereof, but it will be understood that variations and modifications can be effected within the spirit and scope of the invention.

I claim:

1. A beam splitter for use with color image apparatus which includes a luminance channel and a chrominance channel, said beam splitter consisting of:
   two prism elements which are joined together to form a body which is generally triangular in cross section, one of said elements having an input face for receiving an input light beam thereon and a first output face and the other of said elements having a second output face; and
   a dichroic interference filter disposed between said elements for separating said input light beam into a first light beam which exits through said first output face and has a desired spectral content for said luminance channel and into a second light beam which exits through said second output face and has a desired spectral content for said chrominance channel, said first light beam having at lesser amount of blue light than said second light beam and a greater amount of red and green light than said second light beam.

2. A beam splitter, as defined in claim 1, wherein said first prism element is a quadrilateral in cross section.

3. A beam splitter, as defined in claim 2, wherein said second prism element is generally triangular in cross section.

4. A beam splitter, as defined in claim 1, wherein said beam splitter transmits about 75% of the blue light and about 30% of the red and green light in said input light beam.

5. A beam splitter, as defined in claim 4, wherein said filter reflects about 25% of the blue light and about 70% of the red and green light in said input light beam.

6. A beam splitter, as defined in claim 5, wherein said interference filter contains alternate layers of $TiO_2$ and $SiO_2$.

7. A beam splitter, as defined in claim 1, wherein said input light beam impinges on said interference filter at an angle of incidence of about $22\frac{1}{2}°$.

8. A beam splitter, as defined in claim 7, wherein said first light beam forms an angle of about 135° with said second beam.

9. A beam splitter for use with color imaging apparatus, said beam splitter being adapted to separate an input beam of light into first and second output beams of light, said beam splitter having:
   a generally triangular body which has an input face, a first output face through which said first output beam exits said beam splitter, and a second output face through which said second output beam exits said beam splitter; and
   a dichroic interference filter disposed in said body such that an input beam of light entering into said input face at a right angle has an angle of incidence on said filter of at least $22\frac{1}{2}°$, said two output beams each pass through one total internal reflection before exiting the beam splitter, and the angle between said two output beam is greater than 90°.

10. A beam splitter, as defined in claim 9, wherein said angle between said two output beams is about 135°.

11. A beam splitter, as defined in claim 10, wherein said angle of incidence is about $22\frac{1}{2}°$.

12. A beam splitter, as defined in claim 11, wherein said interference filter is formed from alternate layers of $SiO_2$ and $TiO_2$.

13. A beam splitter for use with color imaging apparatus, said beam splitter being adapted to separate an input beam of light into first and second beams of light, said beam splitter comprising:
   a first prism element, said first prism element having an input face which is adapted to receive said input beam and an output face through which said first beam exits from said beam splitter;
   a second prism element joined to said first prism element to form a generally triangular beam splitter, said second prism element being generally triangular in cross section and having an output face through which said second beam exits from said beam splitter; and
   a dichroic interference filter interposed between said first and second prism elements, said dichroic interference filter being disposed at an angle of about $22\frac{1}{2}°$ to said input face.

* * * * *